United States Patent Office 3,022,241
Patented Feb. 20, 1962

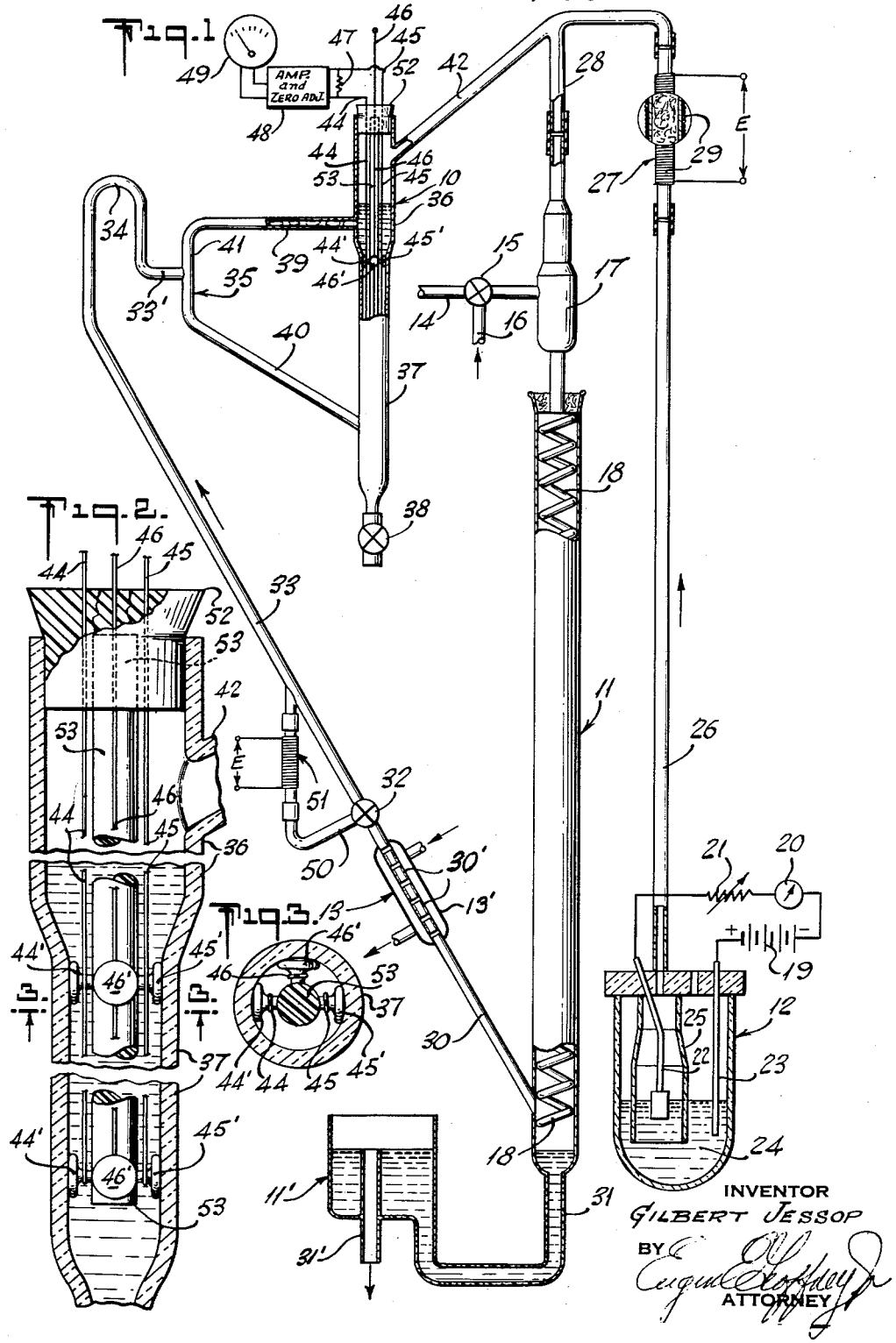

3,022,241
METHOD AND APPARATUS FOR MEASUREMENT OF DISSOLVED OXYGEN
Gilbert Jessop, Cambridge, England, assignor to Cambridge Instrument Company, Inc., New York, N.Y., a corporation of New York
Filed Feb. 11, 1958, Ser. No. 714,615
Claims priority, application Great Britain Feb. 15, 1957
9 Claims. (Cl. 204—195)

This invention relates to the detection and measurement of gas concentrations and more specifically concerns an improved method and apparatus that will afford accurate and precise detection and measurement of oxygen dissolved in water and other liquids.

While the invention is generally useful for the detection and measurement of dissolved oxygen, it is particularly useful in connection with modern high temperature and pressure heating systems of the type generally used for industrial purposes. The measurement of dissolved oxygen has presented several particularly difficult problems, including the isolation of oxygen for the purpose of measuring its concentration and the provision of detecting and measuring apparatus specific to oxygen. These difficulties have been overcome with the present invention which provides a novel and improved oxygen detector characterized by its accuracy, stability and ease of adjustment and calibration.

Another object of the invention resides in the provision of a novel and improved method and apparatus for removing a predetermined portion of the dissolved oxygen from the boiler feed water or other liquids and then measuring the amount of oxygen removed to provide an indication of the amount of oxygen in the sample liquid.

Still another object of the invention resides in the provision of a novel and improved cell for the detection and measurement of oxygen utilizing chemically unreactive electrodes immersed in a buffered solution of predetermined pH.

A further object resides in the provision of novel and improved oxygen detecting cell, embodying substantially chemically inert electrodes immersed in a buffered solution and means for introducing the oxygen to be detected and measured into the cell to effect uniform distribution throughout the solution and about the electrodes.

Another object of the invention resides in the provision of novel and improved means for removing dissolved oxygen from the liquid under test, treating the removed oxygen to remove water particles carried thereby and measuring the quantity of the removed oxygen to provide an accurate determination of dissolved oxygen in the liquid.

A still further object of the invention resides in novel and improved method and apparatus for the detection and measurement of dissolved oxygen.

The above and other objects of the invention will become more apparent in connection with the following description and accompanying drawings forming part of this application.

In the drawings:

FIG. 1 is illustrative of one embodiment of the invention for detection and measurement of dissolved oxygen;

FIG. 2 is an enlarged fragmentary view of FIG. 1 in the same plane; and

FIG. 3 is a section taken along the line 3—3 of FIG. 2.

The illustrated embodiment of the invention includes an improved arrangement of elements for the removal of oxygen dissolved in a liquid by scrubbing the liquid in an atmosphere of hydrogen, treating the resultant atmosphere of hydrogen and oxygen to remove moisture that may be carried thereby and then introducing the atmosphere into a test cell that will respond to the oxygen and provide an indication of the quantity of dissolved oxygen in the liquid. From actual tests it has been found that with this improved detector and apparatus for removing dissolved oxygen, readings specific to dissolved oxygen can be obtained notwithstanding the presence of other chemicals usually found or used in boiler feed water, as for instance, ammonia, morpholine, sodium sulphite and the like. Another important advantage of the invention resides in the improved detector utilizing chemically unreactive elements that prevent contamination of the cell, thus affording means for producing uniform and dependable operation for long periods of time.

Referring now to the drawings, the apparatus includes an electrochemical cell generally denoted by the numeral 10, in which dissolved oxygen removed from a sample liquid is measured. The oxygen is removed from the liquid by means of the scrubbing tower generally denoted by the numeral 11 in which the liquid under test is mixed with a gas such as hydrogen, obtained from a suitable generator 12. The resultant gaseous atmosphere of hydrogen and oxygen is then passed through a condenser 13 whereupon it is introduced into the cell 10.

More specifically, the liquid under test is introduced into the measuring apparatus through a conduit 14 and a three-way valve 15. In order to assure uniform operation of the apparatus it is desirable that this liquid be introduced at a predetermined temperature and pressure and this may be accomplished by feeding the liquid through a suitable temperature control device and then through a constant head cup, both of which are well known in the art and have been omitted from the drawing for purposes of simplicity. A second inlet 16 forming part of the three-way valve 15 is provided for the introduction of a calibrating liquid carrying known quantities of dissolved oxygen for the purpose of calibrating the indicating apparatus, as will be described. The use of an electrolytic cell for the production of predetermined quantities of oxygen in water for purposes of calibration has been found most satisfactory for this purpose.

The liquid under test enters the scrubbing tower 11 through an aspirator 17 and then flows downwardly into the tower 11 which preferably includes a glass spiral 18. At the same time hydrogen is generated in the electrolytic cell 12 by the application of energy from the battery 19, or other voltage source, through a meter 20 and rheostat 21 to electrodes 22 and 23. The electrodes are immersed in a suitable solution 24 such as distilled water and sodium hydroxide and hydrogen is generated about the electrode 22 and within the bell 25. The hydrogen then flows upwardly through the tube 26, thence through a furnace 27 and downwardly through the tube 28 into the aspirator 17. The furnace 27 removes oxygen that may be mixed with the generated hydrogen and utilizes a coil of resistance wire 29 wound about the tube 26 and energized by voltage E. That portion of the tube 26 surrounded by the heating element 29 is filled with palladised asbestos or other similar material that will act as a catalyst for the combination of oxygen and hydrogen. The furnace 27 therefore removes all oxygen from the hydrogen so that pure hydrogen will flow into the tube 28, thence through the aspirator and into the scrubbing tower 11.

The mixture of hydrogen and the liquid under test produces an atmosphere of hydrogen and oxygen and the quantity of oxygen liberated is a known proportion of the total amount of dissolved oxygen in the liquid. A measurement of the liberated oxygen therefore provides a direct indication of the total quantity of dissolved oxygen in the liquid. The atmosphere of oxygen and hydrogen leaves the scrubbing tower through a tube 30 connected to the lower portion thereof and the liquid is discharged from the tower through an outlet tube 31, the constant level cup 11' and the discharge tube 31'.

The hydrogen and oxygen atmosphere is fed through a condenser 13 containing a number of rings 30' of porcelain or other suitable material and a surrounding jacket 13' for the circulation of a coolant. The rings 30' break up bubbles of liquid that may be carried in the gas stream and the condensed liquid is drained back into the scrubbing tower 11. The gaseous mixture of oxygen and hydrogen then passes upwardly through a three-way valve 32, through tube 33 having an upwardly formed U-shaped section 34 and thence into section 41 of tube assembly 35 forming part of the electrochemical cell 10.

The electrochemical cell 10 is provided with a cylindrical body portion 36 having a somewhat smaller downwardly extending tube 37 connected therewith and closed at the bottom by a valve 38. The tube 35 is of generally U-shaped configuration having an upper, generally horizontal leg 39 connected to and communicating with the lower part of the cell body 36. The lower leg 40 communicates with the lower portion of the tube 37 and inclines upwardly to the left, and the tubes 40 and 39 are connected by a substantially vertical tube 41 which communicates with the tube portion 33' constituting part of the tube 33.

The cell 10, together with the elements 35 and 37 are filled, preferably above the level of tube 39, with a conducting solution having a pH generally in the range of 8 to 11, that is well buffered in order to avoid changes of pH during operation of the equipment.

The hydrogen and oxygen gas mixture enters the tube 41 and bubbles through the tube 39 into the body 36 of the cell and this action circulates the buffered solution through the closed circuit including the tubular portions 37, 40, 41 and 39. The oxygen introduced into the cell 10 produces an electric charge in the manner to be described and the remaining hydrogen leaves the cell 10 through the tube 42 where it is fed back to the scrubbing tower 11.

The cell 10 further includes three electrodes 44, 45 and 46 that extend well into the cell portion 37 and preferably below the point of attachment of tube 40. The electrode 44 is the cathode and is preferably formed of gold or other similar material that is chemically unreactive with the solution. The anode electrode 45 is also formed of a substantially chemically unreactive material in which at least the surface is platinum, platinum black, palladium or the like. The third electrode 46 is preferably formed of a material such as platinum or the like and is used for applying a positive charge to the anode so that oxygen will be generated on it by electrolysis should the sensitivity of the cell decrease.

While the electrodes 44, 45 and 46 may be supported in the tube 37 in any desired manner, the illustrated structure is preferred, as it affords support for the electrodes and at the same time reduces the volume of tube 37 to effect increased rate of flow of the solution past the electrodes during operation of the cell. The electrode support is denoted by the numreal 53 and is a rod of glass or other similar material carried by the stopper or cell closure 52 and extending to a point spaced from the bottom of the cell portion 37. The rod includes three sets of upper and lower knobs 44', 45' and 46' for carrying the electrodes 44, 45 and 46, respectively. Each electrode is in the form of a thin wire and is carried by one set of upper and lower knobs so that it extends in substantially parallel, spaced relationship to the rod 53. With this arrangement the solution will circulate freely about the electrodes and will be in contact with them throughout its flow through the tube 37 as described above.

In the operation of the cell 10 a charge is generated between the electrodes 44 and 45 which is proportional to the quantity of oxygen introduced into the cell and, in order to produce a current proportional to the charge, the electrodes are connected by a resistance 47 which is adjusted to limit the maximum current in the cell. The voltage drop across the resistance 47 is then fed to an amplifier 48 and thence to a suitable indicator 49.

As previously pointed out, a mixture of hydrogen and oxygen is fed to and circulated through the cell. The hydrogen saturates the solution and the latter is maintained at a definite hydrogen ion concentration. Under these conditions a definite potential is set up between the anode and the solution, the anode being negative. As the anode is connected through the resistor 47 to the cathode, the cathode will also be maintained negative relative to the solution by the same amount as the anode. The cathode also becomes covered by a layer of hydrogen ions. Now, if the solution in the cell contains oxygen, each oxygen molecule reaching the surface of the cathode may react with four hydrogen ions to form two uncharged water molecules and liberate four positive charges of electricity which casues current to flow through resistor 47. Inasmuch as the liquid is constantly circulated in the cell as described above, and since this circulation effects a substantially uniform distribution of the oxygen in the solution, the current produced in resistor 47 is proportional to the oxygen concentration in the solution and therefore in the boiler feed water.

The solution, as pointed out above, should have a pH of about 8 to 11, and preferably about 9 or 10, and must be well buffered to avoid changes in pH. One solution that may be used includes the following components:

50 mls. of 0–2 M. boric acid; and 0–2 M. potassium chloride
21.4 mls. of 0.2 M. caustic potash
Dilute to 200 mls.

Calibration and adjustment of the equipment is performed by a test solution preferably fed to the apparatus through the tube 16 and mixed with hydrogen from the generator 12, as described. The resultant gas, after passage through the condenser 13 is first directed by the valve 32, through a by-pass tube 50 and furnace 51, identical to the furnace 27 previously described, for the purpose of making a zero adjustment. The furnace 51 removes all oxygen from the gas so that pure hydrogen will be fed to the electrochemical cell 10. Under these conditions the indicator 49 is adjusted to read zero (0). Because of residual currents a reading other than zero may be obtained, and this may be balanced out by a suitable adjustment in the amplifier 48 which inserts an equal and opposite potential in series with the input from the resistor 47. When zero adjustment has been obtained, the valve 32 is moved to the normal operating position which removes the furnace 51 from the fluid circuit. Calibration is accomplished by feeding test solutions, having known quantities of dissolved oxygen, to the apparatus through the inlet 16 to enable calibration of the indicator 49 and amplifier 48 so that a direct reading of oxygen content will be obtained.

Actual tests with the equipment as described above have indicated that its zero stability and calibration are constant over extended periods of time and that the equipment will provide accurate measurements of dissolved oxygen over the range of zero to at least .1 part per million. Normally, dissolved oxygen contents in boiler feed water may run as low as .004 part per million and will not normally exceed .05.

The invention as described above constitutes a highly important advance in the detection and measurement of oxygen as it forms a highly sensitive instrument specific to oxygen that will function dependably for extended periods of time. The electrodes, for instance, are chemically unreactive in the buffered solution, can be quickly and easily reactivated when necessary and without removing them from the equipment. The position of the electrodes in the solution is not critical except that they should be at least partially immersed and the solution should flow rapidly and uniformly over them. This flow is attained through the improved cell structure as described, and the manner in which the hydrogen and oxygen mixture is introduced therein. The hydrogen gas, for instance, serves three purposes, namely, to scrub oxygen out of the liquid under test, to saturate the solution in the cell 10 and to provide the pressure required to effect the desired circulation of the buffered solution over the electrodes.

While only one embodiment of the invention has been illustrated and described, it is apparent that modifications, alterations and changes may be made without departing from the true scope and spirit thereof as defined by the appended claims.

What is claimed is:

1. An oxygen responsive electro-chemical cell comprising a container having an electrically conductive liquid therein, a pair of electrodes of dissimilar noble metals within said cell and extending into said liquid, hydrogen supply means coupled with said container to maintain said liquid in a substantially uniformly hydrogen saturated condition, means for circulating oxygen through said solution and about at least one of said electrodes, and electrical measuring apparatus including a conductive impedance for direct current connected to said electrodes to indicate the magnitude of electrical output of said cell produced by the presence of oxygen in said liquid.

2. An oxygen responsive electro-chemical cell according to claim 1 wherein said electrodes are formed of gold and platinum respectively.

3. An oxygen responsive electro-chemical cell according to claim 2 wherein said platinum electrode includes a layer of platinum black.

4. An oxygen responsive electro-chemical cell according to claim 1 wherein said liquid comprises a solution including boric acid, potassium chloride and caustic potash and having a PH in the range of 8 to 11.

5. An oxygen measuring apparatus comprising a vertically disposed elongated container having a pair of vertically spaced openings, a tube connecting said openings, the last said tube including inlet means, conductive solution filling said container and connecting tube, a pair of electrodes of dissimilar noble metals extended into said liquid, a hydrogen supply including means connecting said supply to said inlet means, said hydrogen upon entering said connecting tube causing circulation of said liquid through the container and said connecting tube, means interconnected with said hydrogen supply for the introduction of oxygen to be measured into said cell, said hydrogen functioning to maintain the liquid in a hydrogen saturated condition and distributing the oxygen uniformly about at least one of the electrodes, and electrical measuring apparatus including a conductive impedance for direct current connected to said electrodes to indicate the magnitude of the electric output of said cell produced by the presence of oxygen in said liquid.

6. Oxygen measuring apparatus according to claim 5 wherein one of said electrodes is formed of gold and the other of said electrodes is formed of platinum.

7. Oxygen measuring apparatus comprising a hydrogen gas supply, a source of liquid containing dissolved oxygen to be measured, a scrubbing tower including inlet means for admitting liquid under test to said tower, an aspirator interconnected with means to said scrubbing tower and with said hydrogen supply, said scrubbing tower producing an atmosphere containing hydrogen and a predetermined portion of the dissolved oxygen in said liquid, an outlet tube connected with said scrubbing tower for removing said hydrogen-oxygen atmosphere, a measuring cell comprising a container having an electrically conductive liquid therein, a pair of electrodes of dissimilar noble metals within said cell and extending into said liquid, tubular means connecting said cell with the outlet of said scrubbing tower to introduce said gaseous hydrogen-oxygen atmosphere into said cell, said hydrogen functioning to maintain the liquid in said cell in a hydrogen saturated condition, and electrical measuring apparatus including a conductive impedance for direct current connected to said electrodes to indicate the magnitude of the electric output of said cell produced by the presence of oxygen in said liquid.

8. Oxygen measuring apparatus according to claim 7 wherein said container includes a pair of vertically disposed openings and a tube including inlet means interconnecting said openings with said inlet means being interconnected with the outlet of said scrubbing tower and wherein one of said electrodes is formed of platinum.

9. Oxygen measuring apparatus accordiing to claim 8 wherein the container is closed and includes an opening above the level of the liquid therein, said opening being interconnected with said hydrogen supply means to effect recirculation of excess hydrogen introduced into said cell.

References Cited in the file of this patent

UNITED STATES PATENTS

| | | |
|---|---|---|
| 2,114,234 | Ornstein | Apr. 12, 1938 |
| 2,254,070 | Jacocks | Aug. 26, 1941 |
| 2,320,095 | Ornstein | May 25, 1943 |
| 2,370,871 | Marks | Mar. 6, 1945 |
| 2,425,669 | Brock | Aug. 12, 1947 |
| 2,651,612 | Haller | Sept. 8, 1953 |
| 2,705,220 | Arthur | Mar. 29, 1955 |
| 2,758,079 | Eckfeldt | Aug. 7, 1956 |
| 2,805,191 | Hersch | Sept. 3, 1957 |
| 2,811,425 | Houdry | Oct. 29, 1957 |
| 2,820,702 | James | Jan. 21, 1958 |

OTHER REFERENCES

Dole: "Glass Electrode," 1941, John Wiley & Sons, Inc., pp. 14–18.

Electro-Chemical Dissolved Oxygen Recorder, Cambridge Instrument Co., Ltd., May 1957, publication 323/1.